US012317031B2

(12) United States Patent
Kawagoe et al.

(10) Patent No.: US 12,317,031 B2
(45) Date of Patent: May 27, 2025

(54) ELECTRICAL DEVICE

(71) Applicant: Panasonic Intellectual Property Management Co., Ltd., Osaka (JP)

(72) Inventors: Shohei Kawagoe, Osaka (JP); Katsushi Tamai, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 207 days.

(21) Appl. No.: 17/919,691

(22) PCT Filed: Oct. 6, 2021

(86) PCT No.: PCT/JP2021/036915
§ 371 (c)(1),
(2) Date: Oct. 18, 2022

(87) PCT Pub. No.: WO2022/180913
PCT Pub. Date: Sep. 1, 2022

(65) Prior Publication Data
US 2023/0164481 A1 May 25, 2023

(30) Foreign Application Priority Data
Feb. 25, 2021 (JP) ................................ 2021-028197

(51) Int. Cl.
*H04R 1/28* (2006.01)
*H04R 1/02* (2006.01)
(Continued)

(52) U.S. Cl.
CPC ............ *H04R 1/288* (2013.01); *H04R 1/025* (2013.01); *H04R 3/00* (2013.01); *H04R 7/12* (2013.01);
(Continued)

(58) Field of Classification Search
CPC .... H04R 1/025; H04R 1/2896; H04R 31/003; H04R 7/045; H04R 2201/021; H04R 3/00;
(Continued)

(56) References Cited

U.S. PATENT DOCUMENTS 6,904,157 B2 6/2005 Shima
6,990,212 B2 1/2006 Kambe
(Continued)

FOREIGN PATENT DOCUMENTS

EP 3130832 B1 * 7/2020 ............ F16M 13/02
GB 2544548 A * 5/2017
(Continued)

OTHER PUBLICATIONS

International Search Report issued on Nov. 16, 2021 in International Patent Application No. PCT/ JP2021/036915, with English translation.

(Continued)

*Primary Examiner* — Carolyn R Edwards
*Assistant Examiner* — Kuassi A Ganmavo
(74) *Attorney, Agent, or Firm* — Rimon P.C.

(57) ABSTRACT

The electrical device is an electrical device that is mounted on a wall of a building, the electrical device including: an actuator that vibrates; and absorbing member that absorbs vibration of the actuator and is positioned behind the actuator in a predetermined direction, where a direction from a back side to a front side of the wall is defined as a direction toward a front in the predetermined direction in a state where the electrical device is mounted on the wall.

8 Claims, 8 Drawing Sheets

(51) Int. Cl.

| | |
|---|---|
| ***H04R 3/00*** | (2006.01) |
| ***H04R 7/12*** | (2006.01) |
| ***H04R 7/18*** | (2006.01) |
| ***H04R 9/02*** | (2006.01) |
| ***H04R 9/04*** | (2006.01) |
| ***H04R 9/06*** | (2006.01) |

(52) U.S. Cl.
CPC ................ *H04R 7/18* (2013.01); *H04R 9/025* (2013.01); *H04R 9/046* (2013.01); *H04R 9/06* (2013.01); *H04R 2201/021* (2013.01); *H04R 2400/11* (2013.01)

(58) Field of Classification Search
CPC ... H04R 7/12; H04R 7/18; H04R 9/25; H04R 9/46; H04R 9/06; H04R 2400/11; F16F 3/0876; F16F 15/08; F16F 1/371
See application file for complete search history.

(56) References Cited

U.S. PATENT DOCUMENTS

| | | | | |
|---|---|---|---|---|
| 2004/0129492 | A1* | 7/2004 | Bertagni .................. | H05K 5/02 181/173 |
| 2005/0029878 | A1* | 2/2005 | Flanagan ............... | H10N 35/00 310/26 |
| 2005/0279566 | A1* | 12/2005 | Hooley .................. | H04R 17/00 181/163 |
| 2006/0013417 | A1* | 1/2006 | Bailey .................. | H04R 31/003 381/152 |
| 2012/0263338 | A1* | 10/2012 | Hori ......................... | H04R 3/02 381/398 |
| 2013/0011001 | A1* | 1/2013 | Fujimori ................ | H04R 1/025 381/413 |
| 2015/0365746 | A1* | 12/2015 | Cheung .................... | H04R 1/02 381/152 |
| 2017/0099542 | A1* | 4/2017 | Strange .................... | H04R 1/26 |
| 2019/0090047 | A1* | 3/2019 | Ivey ....................... | H04R 1/227 |
| 2020/0260181 | A1 | 8/2020 | Talbi | |
| 2023/0018827 | A1* | 1/2023 | Niu ........................ | H04R 9/025 |

FOREIGN PATENT DOCUMENTS

| | | | | | |
|---|---|---|---|---|---|
| JP | 01-135294 | A | | 5/1989 | |
| JP | H06-057078 | B2 | | 7/1994 | |
| JP | 9-82116 | A | | 3/1997 | |
| JP | 2002-281579 | A | | 9/2002 | |
| JP | 2003-102081 | A | | 4/2003 | |
| JP | 2006101961 | A | * | 4/2006 | |
| JP | 2006133639 | A | * | 5/2006 | |
| JP | 2012198407 | A | * | 10/2012 | |
| JP | 2019-102291 | A | | 6/2019 | |
| WO | WO-0016591 | A1 | * | 3/2000 | ............. H04R 1/288 |

OTHER PUBLICATIONS

Extended European Search Report dated Jul. 2, 2024 issued in the corresponding European Patent Application No. 21928008.8.

* cited by examiner

ELECTRICAL DEVICE

CROSS-REFERENCE OF RELATED APPLICATIONS

This application is the U.S. National Phase under 35 U.S.C. § 371 of International Patent Application No. PCT/JP2021/036915, filed on Oct. 6, 2021, which in turn claims the benefit of Japanese Patent Application No. 2021-028197, filed on Feb. 25, 2021, the entire disclosures of which Applications are incorporated by reference herein.

TECHNICAL FIELD

The present disclosure relates to an electrical device, and more specifically to an electrical device mounted on a wall of a building.

BACKGROUND ART

Conventionally, an electrical device such as a speaker is known. As an example of this type of prior art, Patent Literature (PTL) 1 discloses a speaker unit mounted on a baffle plate with a vibration absorbing member interposed between the speaker unit and the baffle plate.

CITATION LIST

Patent Literature

[PTL 1] Japanese Unexamined Patent Application Publication No. 2002-281579

SUMMARY OF INVENTION

Technical Problem

When the electrical device having an actuator such as the speaker unit of PTL 1 is mounted on the wall of a building, the vibration of the actuator is transmitted to the wall, causing the wall to vibrate and generate noise. Therefore, in order to suppress the vibration of the wall, it is common to install a sound absorbing material on the wall. However, because it requires a certain amount of money to install a sound absorbing material, and there are time restrictions such that a sound absorbing material can only be installed during new construction or renovation, it is not easy to install any sound absorbing material, and it is not easy to suppress the vibration of the wall.

Therefore, the present disclosure provides the electrical device that can easily suppress the vibration of the wall.

Solution to Problem

The electrical device according to an aspect of the present disclosure is an electrical device that is mounted on a wall of a building, the electrical device including: an actuator that vibrates; and an absorbing member that absorbs vibration of the actuator and is positioned behind the actuator in a predetermined direction, where a direction from a back side to a front side of the wall is defined as a direction toward a front in the predetermined direction in a state where the electrical device is mounted on the wall.

Advantageous Effects of Invention

The electrical device of the present disclosure can easily suppress the vibration of the wall.

DESCRIPTION OF EMBODIMENTS

Figure 1:
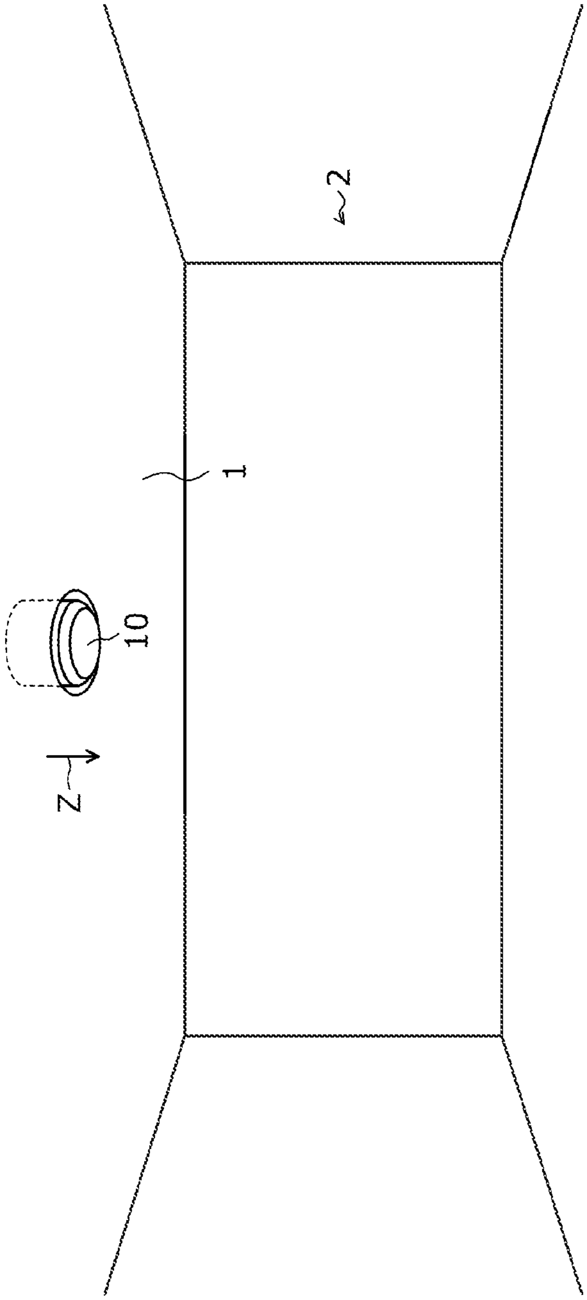
FIG. 1 is a diagram showing a state in which an electrical device according to an embodiment is mounted on a wall of a building.

Hereinafter, embodiments will be specifically described with reference to the drawings.

It should be noted that all the embodiments described below show comprehensive or specific examples. Numerical values, shapes, materials, components, arrangement positions and connection forms of components, steps, order of steps, and the like shown in the following embodiments are examples, and are not intended to limit the present disclosure.

In addition, among the components in the following embodiments, the components that are not described in independent claims indicating the broadest concept will be described as optional components. In addition, each figure is a schematic diagram and is not necessarily strictly illustrated. In addition, in each figure, the same component members are designated with the same reference numerals.

In this specification and drawings, the X-axis, Y-axis, and Z-axis represent the three axes of a three-dimensional orthogonal coordinate system, and the X-axis and Y-axis are the axes orthogonal to each other and orthogonal to the Z-axis. The Z-axis plus direction is a direction that coincides with the direction from the back side to the front side of the wall on which the electrical device is mounted.

Embodiment

FIG. 1 is a diagram showing a state in which electrical device 10 according to the embodiment is mounted on wall 1 of the building.

As shown in FIG. 1, electrical device 10 is an electrical device mounted on wall 1 of the building. In this embodiment, electrical device 10 is an embedded speaker embedded in wall 1, and wall 1 is a wall included in the ceiling of room 2 inside the building. In this embodiment, wall 1 includes socket component 3 (see FIG. 5 and FIG. 6) that is engageable attachment member 18 (described below), and electrical device 10 is mounted on wall 1 by being engaged with socket component 3.

Figure 2:
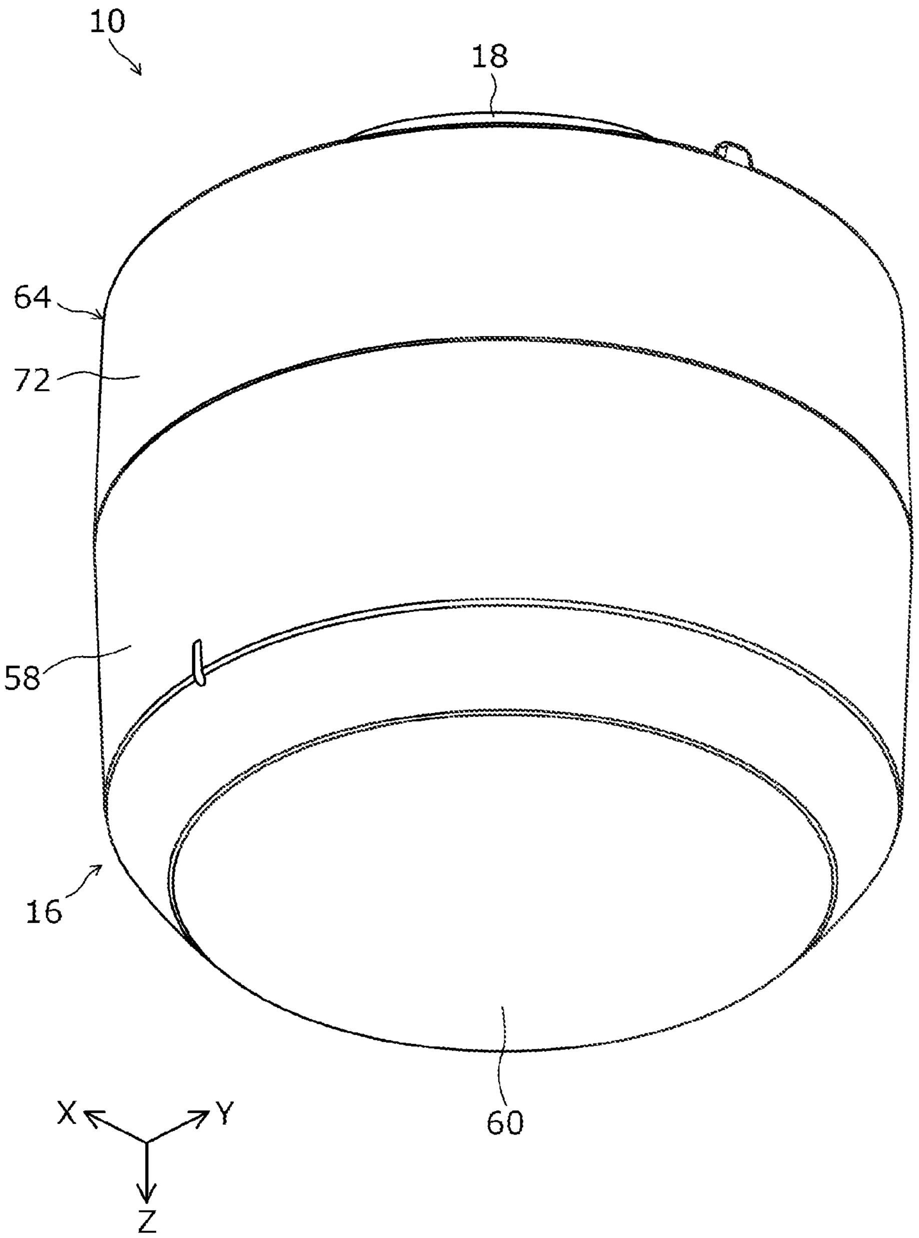
FIG. 2 is a perspective view of the electrical device of FIG. 1 as viewed from the front side in a predetermined direction.
Figure 3:
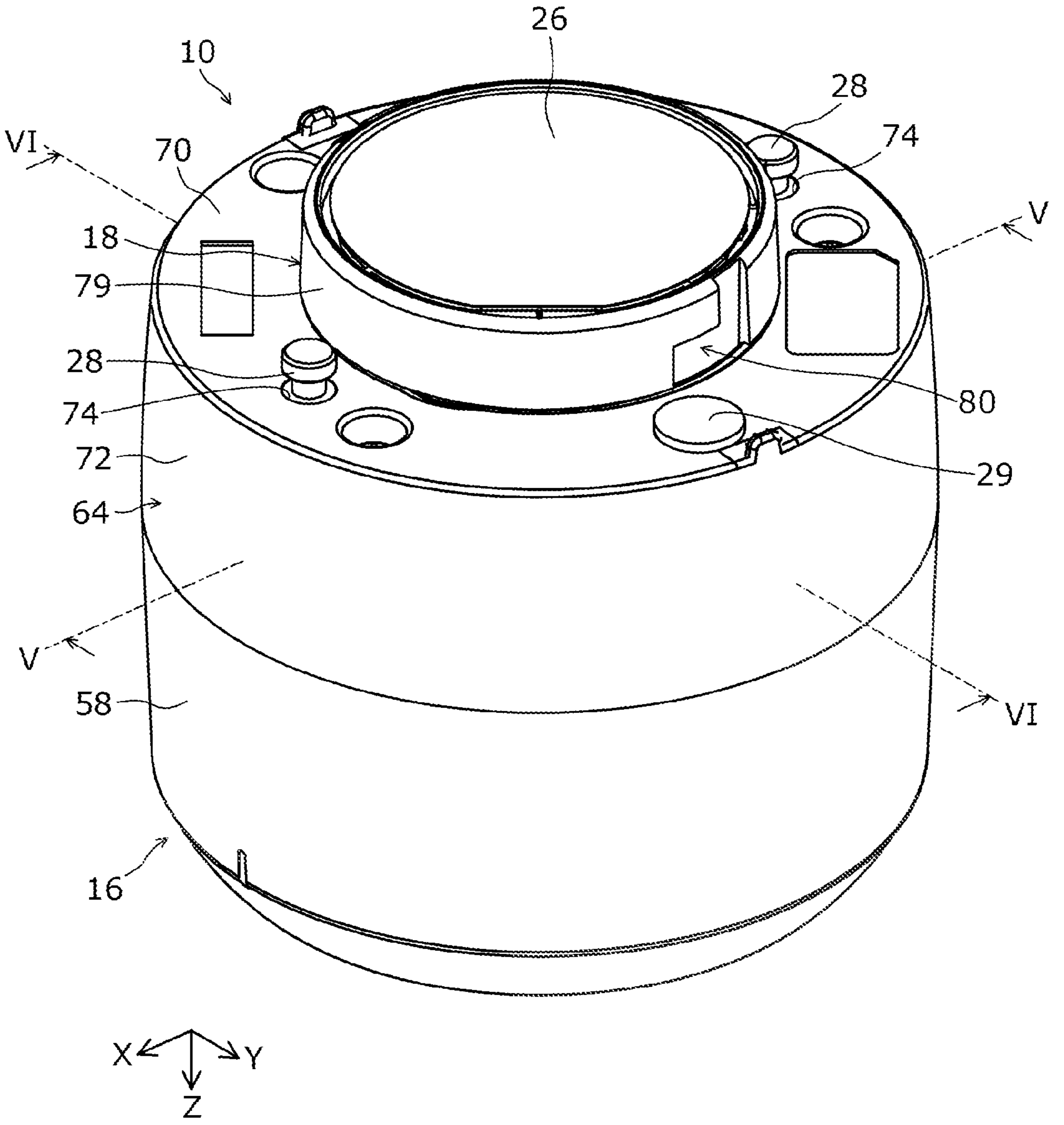
FIG. 3 is a perspective view of the electrical device of FIG. 1 as viewed from the back side in a predetermined direction.
Figure 4:
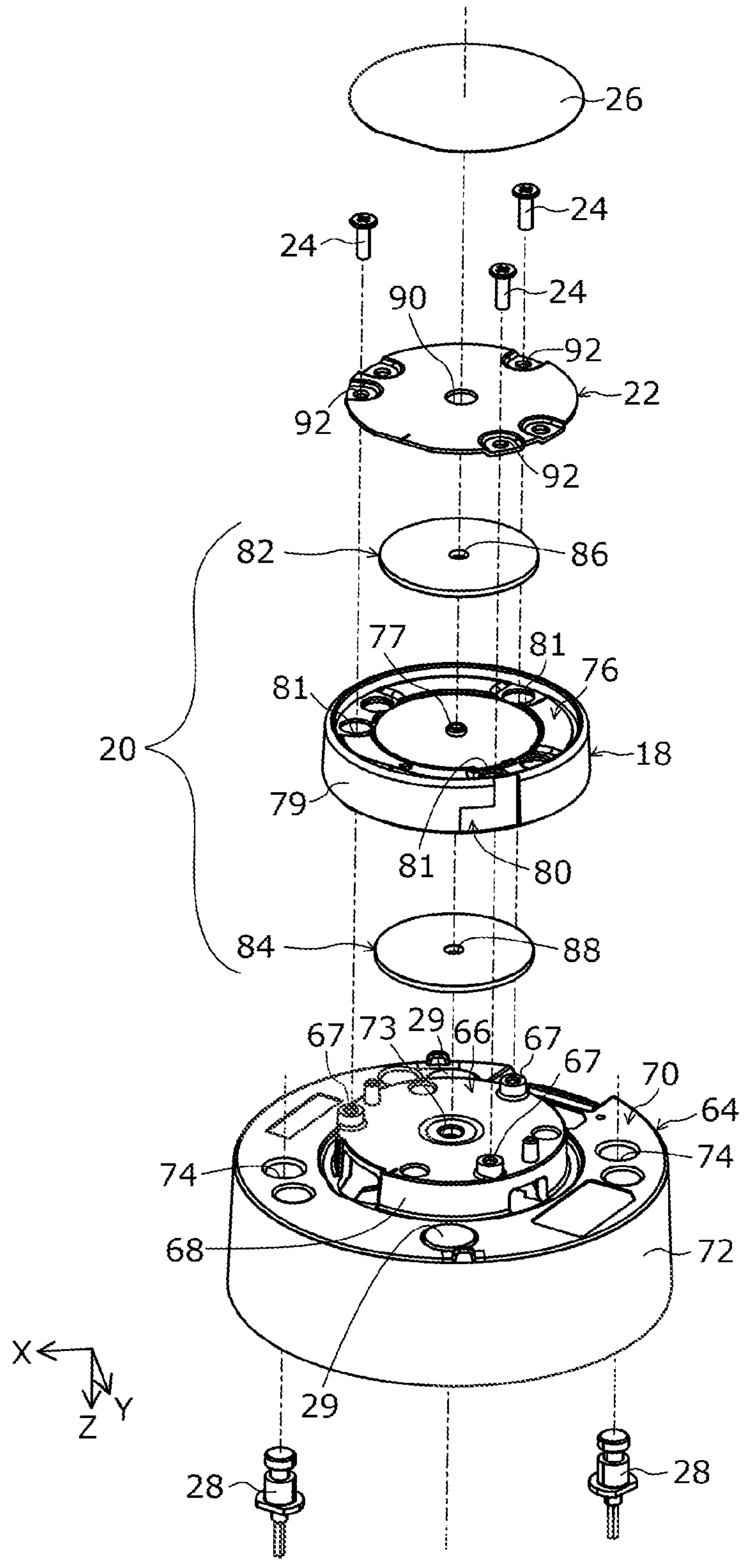
FIG. 4 is an exploded perspective view of a portion of the electrical device of FIG. 1.
Figure 5:
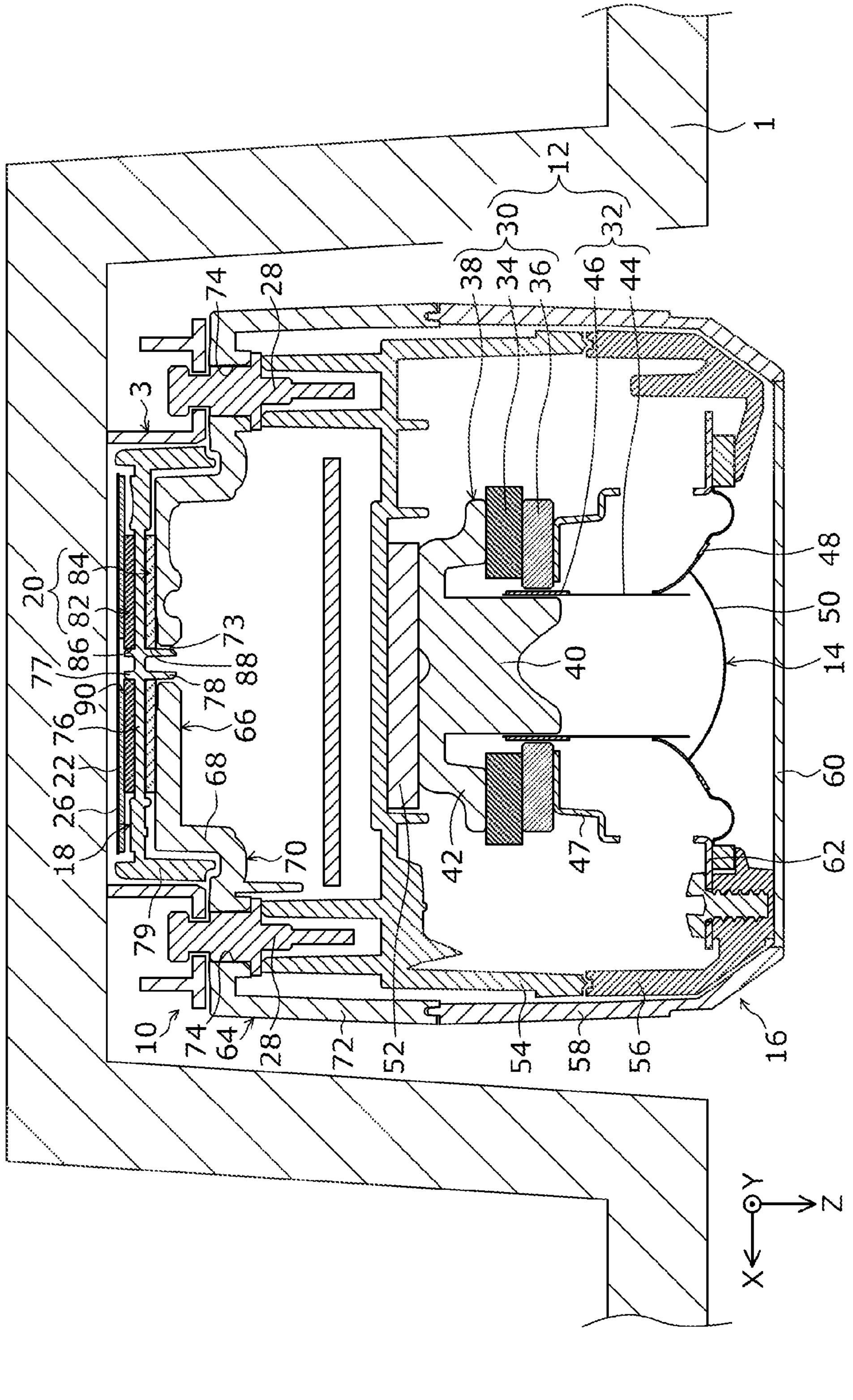
FIG. 5 is an end view taken along line V-V in FIG. 3.
Figure 6:
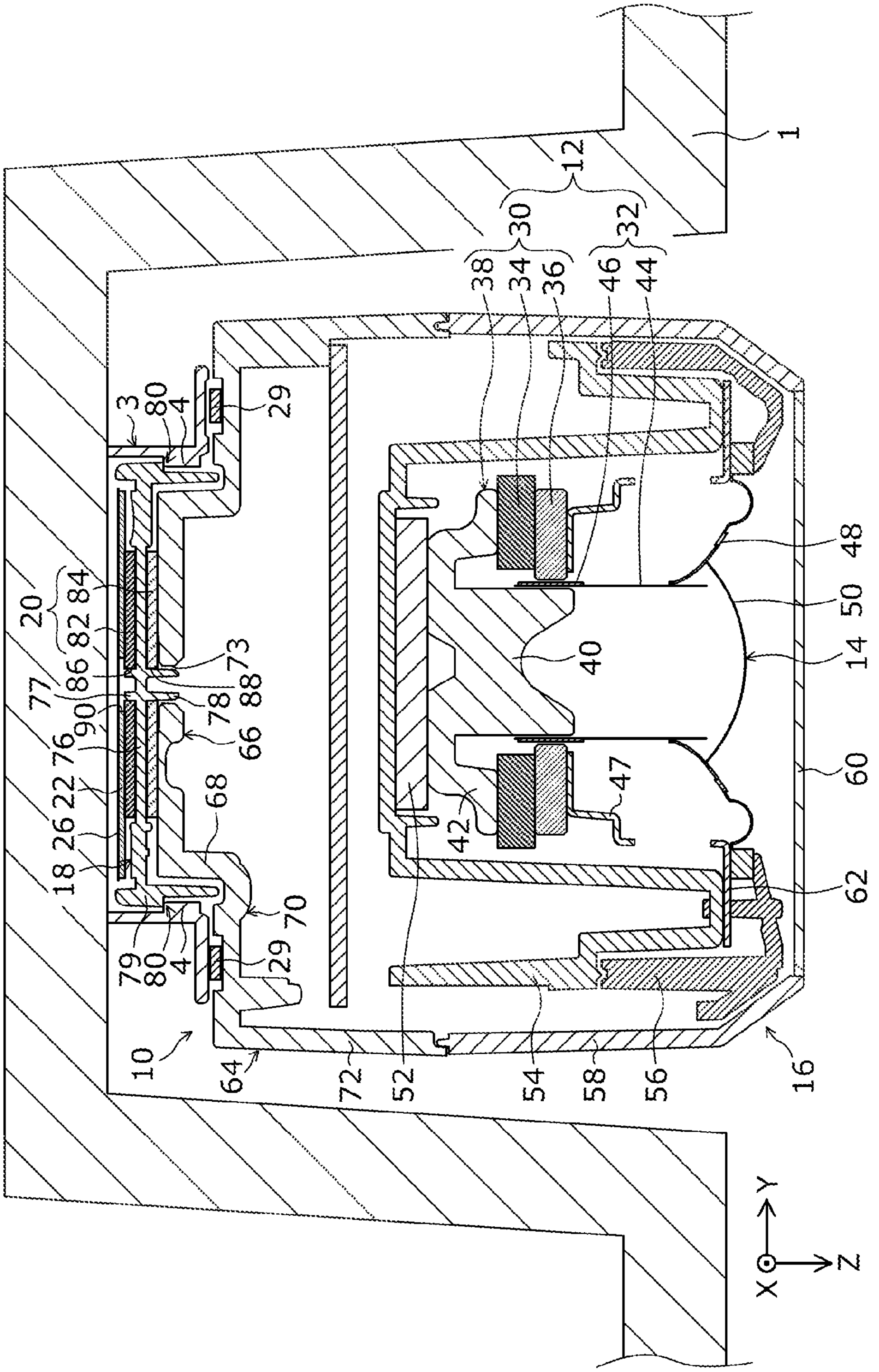
FIG. 6 is an end view taken along line VI-VI in FIG. 3.

FIG. 2 is a perspective view of electrical device 10 of FIG. 1 as viewed from the front side in a predetermined direction. Specifically, FIG. 2 is a perspective view of electrical device 10 mounted on wall 1 as viewed from the front side in a predetermined direction. It should be noted that the illustration of wall 1 is omitted in FIG. 2 in order to avoid complicating the drawing. FIG. 3 is a perspective view of electrical device 10 of FIG. 1 as viewed from the back side in a predetermined direction. Specifically, FIG. 3 is a perspective view of electrical device 10 mounted on wall 1 as viewed from the back side in a predetermined direction. It should be noted that the illustration of wall 1 is omitted in FIG. 3 in order to avoid complicating the drawing. FIG. 4 is an exploded perspective view of part of electrical device 10 in FIG. 1. FIG. 5 is an end view taken along line V-V in FIG. 3. FIG. 6 is an end view taken along line VI-VI in FIG. 3.

The predetermined direction is a direction in which the direction from the back side to the front side of wall 1 is the front. In the following description, the predetermined direction may be the Z-axis direction, the front in the predetermined direction may be the Z-axis plus direction, and the back in the predetermined direction may be the Z-axis minus direction. In addition, in the following description, the surface of a certain member on the side in the Z axis plus direction may be referred to as the front surface, and the surface of a certain member on the side in the Z axis minus direction may be referred to as the rear surface.

As shown in FIG. 2 to FIG. 6, electrical device 10 includes actuator 12, diaphragm 14, main body member 16, attachment member 18, absorbing member 20, support member 22, a plurality of fastening members 24, cover member 26, a plurality of terminals 28 and a plurality of absorbing members 29. In this embodiment, electrical device 10 emits sound in the Z-axis plus direction by actuator 12 vibrating, and the direction in which electrical device 10 emits sound is the front.

Actuator 12 vibrates based on power supplied from an external power supply (not shown). In this embodiment, actuator 12 vibrates back and forth in a predetermined direction (Z-axis direction) in a state where electrical device 10 is mounted on wall 1. As described above, the predetermined direction is the direction in which the direction from the back side to the front side of wall 1 is the front. In this embodiment, the back side of wall 1 is the opposite side of wall 1 from room 2, the front side of wall 1 is the room 2 side of wall 1, and the predetermined direction is the direction orthogonal to the main surface on the front side of wall 1 and the direction orthogonal to the direction in which wall 1 is spread (the direction parallel to the XY plane). Actuator 12 includes magnetic circuit 30 and voice coil body 32.

Magnetic circuit 30 includes magnet 34, plate 36, and yoke 38, and generates magnetic flux.

Magnet 34 is a magnetized permanent magnet. Magnet 34 is in an annular shape. In the state where electrical device 10 is mounted on wall 1, the axial direction of magnet 34 coincides with the Z-axis direction, and magnet 34 is in the form of a plate whose thickness direction is the Z-axis direction.

Plate 36 is in an annular shape and is provided coaxially with magnet 34. In the state where electrical device 10 is mounted on wall 1, plate 36 is in the form of a plate whose thickness direction is the Z-axis direction, and is provided on the front surface of magnet 34. For example, plate 36 is formed of a ferromagnetic material such as iron.

Yoke 38 includes middle portion 40 and flange portion 42. Central portion 40 is in the shape of a solid cylinder, is inserted through the inside of magnet 34 (inside of the annular shape) and the inside of plate 36, and is provided coaxially with magnet 34. A magnetic gap is formed between central portion 40 and plate 36. Flange portion 42 is in an annular shape and is provided coaxially with magnet 34. In the state where electrical device 10 is mounted on wall 1, flange portion 42 protrudes from the rear end of central portion 40 in a direction orthogonal to the Z-axis direction, and magnet 34 is provided on the front surface of flange portion 42. For example, yoke 38 is formed of a ferromagnetic material such as iron.

Voice coil body 32 includes bobbin 44 and coil 46. Bobbin 44 is in the shape of a hollow cylinder, and central portion 40 is inserted through the inside of bobbin 44. Coil 46 is wound around the outer peripheral surface of bobbin 44. In the state where electrical device 10 is mounted on wall 1, the rear end of bobbin 44 is provided in the magnetic gap formed by magnetic circuit 30 together with coil 46. In addition, in the state where electrical device 10 is mounted on wall 1, the front end of bobbin 44 is connected to diaphragm 14. When audio signals are input to coil 46, voice coil body 32 vibrates in the axial direction of magnet 34 due to the interaction with the magnetic flux generated by magnetic circuit 30. That is, in the state where electrical device 10 is mounted on wall 1, voice coil body 32 vibrates back and forth in the Z-axis direction. For example, the audio signals are transmitted to electrical device 10 by wireless communication from an external communication terminal (not shown) such as a smart phone. Voice coil body 32 may be coupled to speaker frame 47 via a damper (not shown). Speaker frame 47 is a member provided with mounting bracket 62.

Diaphragm 14 vibrates due to the vibration of actuator 12. Diaphragm 14 includes annular portion 48 and center cap 50. Annular portion 48 is in an annular shape, the inner peripheral portion of annular portion 48 is fixed to bobbin 44, and the outer peripheral portion of annular portion 48 is fixed to first shell member 58 via mounting bracket 62 of main body member 16, second frame member 56, and the like. In the state where electrical device 10 is mounted on wall 1, annular portion 48 has a shape that gradually widens toward the front. Diaphragm 14 vibrates by voice coil body 32 vibrating, and outputs sound to the front. Center cap 50 is mounted on the central portion of annular portion 48 and covers the front of voice coil body 32 in the state where electrical device 10 is mounted on wall 1.

Main body member 16 is a body member to which actuator 12 is fixed, and is provided so as to be positioned between actuator 12 and attachment member 18. Main body member 16 is a housing that houses actuator 12. Main body member 16 includes fixing member 52, first frame member 54, second frame member 56, first shell member 58, cover member 60, mounting bracket 62, and second shell member 64.

In the state where electrical device 10 is mounted on wall 1, fixing member 52 of main body member 16 is in the form of a plate whose thickness direction is the Z-axis direction, and is provided on the rear surface of yoke 38. Fixing member 52 is fixed to first frame member 54 of main body member 16. Fixing member 52 is a cushion for the purpose of damping the vibration of magnetic circuit 30. Magnetic circuit 30 includes yoke 38, magnet 34 and plate 36, which are fixed to one another. Magnetic circuit 30 is fixed to speaker frame 47. Mounting bracket 62 is provided on speaker frame 47. Speaker frame 47 is fixed to first shell member 58 by mounting bracket 62 being mounted on first shell member 58.

In the state where electrical device 10 is mounted on wall 1, first frame member 54 of main body member 16 is in a bottomed tubular shape whose axial direction is the Z-axis direction, and is provided on the periphery of actuator 12 and behind actuator 12. In the state where electrical device 10 is mounted on wall 1, second frame member 56 of main body member 16 is in a tubular shape whose axial direction is the Z-axis direction, is provided coaxially with first frame member 54 of main body member 16, and is fixed to the front portion of first frame member 54.

In the state where electrical device 10 is mounted on wall 1, first shell member 58 of main body member 16 is in a tubular shape whose axial direction is the Z-axis direction, is provided coaxially with first frame member 54 of main body member 16, and covers the periphery of first frame member 54 and the periphery of second frame member 56.

In the state where electrical device 10 is mounted on wall 1, cover member 60 of main body member 16 is provided in front of actuator 12 and is mounted on the opening of first shell member 58 of main body member 16. In the state where electrical device 10 is mounted on wall 1, cover member 60 includes a plurality of through holes (not shown) penetrating through cover member 60 in the Z-axis direction. Sound output by the vibration of actuator 12 is emitted to the outside of electrical device 10 through the plurality of through holes.

Mounting bracket 62 of main body member 16 is a bracket for mounting diaphragm 14 to first shell member 58 of main body member 16.

In the state where electrical device 10 is mounted on wall 1, second shell member 64 of main body member 16 is in a bottomed tubular shape whose axial direction is the Z-axis direction, is provided coaxially with main body member 16, is open to the front, and is fixed to the rear portion of first shell member 58 of main body member 16. Second shell member 64 includes first plate-shaped portion 66, a plurality of threaded portions 67, first peripheral wall 68, second plate-shaped portion 70, and second peripheral wall 72.

First plate-shaped portion 66 is provided between actuator 12 and second member 84. In the state where electrical device 10 is mounted on wall 1, first plate-shaped portion 66 is in the form of a plate whose thickness direction is the Z-axis direction, is in an annular shape having through hole 73 in the center when viewed from the Z-axis direction, and is provided behind actuator 12 and in front of second member 84. That is, first plate-shaped portion 66 overlaps actuator 12 and second member 84 when viewed from the Z-axis direction in the state where electrical device 10 is mounted on wall 1.

A plurality of threaded portions 67 are provided on first plate-shaped portion 66, and a plurality of fastening members 24 are threadedly engaged. In a state where electrical device 10 is mounted on wall 1, first peripheral wall 68 protrudes to the front from the outer peripheral portion of first plate-shaped portion 66 and is in a tubular shape. In the state where electrical device 10 is mounted on wall 1, second plate-shaped portion 70 protrudes outward in a direction orthogonal to the Z-axis direction from the front end of first peripheral wall 68, and is in an annular shape when viewed from the Z-axis direction. Second plate-shaped portion 70 includes a plurality of through holes 74 through which the plurality of terminals 28 are inserted. In the state where electrical device 10 is mounted on wall 1, second peripheral wall 72 protrudes to the front from the outer peripheral portion of second plate-shaped portion 70, and is in a tubular shape that is annular when viewed from the Z-axis direction. The front end of second peripheral wall 72 is connected to first shell member 58 of main body member 16.

For example, fixing member 52, first frame member 54, second frame member 56, first shell member 58, cover member 60, and second shell member 64 of main body member 16 are formed of resin or the like.

In the state where electrical device 10 is mounted on wall 1, attachment member 18 is positioned behind actuator 12 in the Z-axis direction and is attached to wall 1. First member 82 is provided between attachment member 18 and support member 22, and attachment member 18 is not in contact with support member 22 at least when actuator 12 is not vibrating. In addition, second member 84 is provided between attachment member 18 and first plate-shaped portion 66 of main body member 16, and attachment member 18 is not in contact with main body member 16 at least when actuator 12 is not vibrating. For example, attachment member 18 is formed of resin or the like. Attachment member 18 includes plate-shaped portion 76, first protrusion 77, second protrusion 78, peripheral wall 79, and a plurality of engaging portions 80.

In the state where electrical device 10 is mounted on wall 1, plate-shaped portion 76 is in the form of a plate whose thickness direction is the Z-axis direction, and is positioned behind actuator 12 and first plate-shaped portion 66. That is, plate-shaped portion 76 overlaps actuator 12 and first plate-shaped portion 66 when viewed from the Z-axis direction in the state where electrical device 10 is mounted on wall 1. Plate-shaped portion 76 includes a plurality of through holes 81 through which the plurality of fastening members 24 are inserted. The plurality of through holes 81 are not in contact with the plurality of fastening members 24.

In the state where electrical device 10 is mounted on wall 1, first protrusion 77 protrudes to the back from the central portion of plate-shaped portion 76. First protrusion 77 is inserted through through hole 86 of first member 82.

In the state where electrical device 10 is mounted on wall 1, second protrusion 78 protrudes to the front from the central portion of plate-shaped portion 76. Second protrusion 78 is inserted through hole 73 of main body member 16 and through hole 88 of second member 84. Second protrusion 78 is not in contact with through hole 73 of main body member 16.

In the state where electrical device 10 is mounted on wall 1, peripheral wall 79 includes a portion that protrudes to the front from the outer peripheral portion of plate-shaped portion 76 and the inner peripheral surface of the portion faces first peripheral wall 68. In addition, in the state where electrical device 10 is mounted on wall 1, peripheral wall 79 includes a portion that protrudes to the back from the outer peripheral portion of plate-shaped portion 76 and the inner peripheral surface of the portion faces support member 22.

Each of the plurality of engaging portions 80 detachably engages with wall 1. Specifically, each of the plurality of engaging portions 80 is recessed on the outer peripheral surface of peripheral wall 79, engages with socket component 3 by being hooked on protrusion 4 of socket component 3, and is mounted on wall 1. Socket component 3 is included in wall 1. That is, protrusion 4 is included in wall 1.

In the state where electrical device 10 is mounted on wall 1, absorbing member 20 is positioned behind actuator 12 in the Z-axis direction and absorbs the vibration of actuator 12. That is, in the state where electrical device 10 is mounted on wall 1, absorbing member 20 overlaps actuator 12 when viewed from the Z-axis direction. Absorbing member 20 includes first member 82 and second member 84.

First member 82 is provided on the opposite side of attachment member 18 from actuator 12 and is provided between attachment member 18 and support member 22. That is, in the state where electrical device 10 is mounted on wall 1, first member 82 is positioned behind attachment member 18 and actuator 12 and in front of support member 22 and overlaps attachment member 18, actuator 12, and support member 22 when viewed from the Z-axis direction. In the state where electrical device 10 is mounted on wall 1, first member 82 is in the form of a plate whose thickness direction is the Z-axis direction and is in an annular shape having through hole 86 in the center when viewed from the Z-axis direction. The main surface of first member 82 on the side of actuator 12 is in contact with plate-shaped portion 76, and the main surface on the opposite side of first member 82 from actuator 12 is in contact with support member 22. First member 82 is covered with attachment member 18 and support member 22 and housed inside electrical device 10. First member 82 has greater elasticity (flexibility) than attachment member 18 and support member 22. For example, first member 82 is formed of soft urethane, urethane foam, rubber, or the like.

Second member 84 is provided on the side of actuator 12 of attachment member 18 and is provided between attachment member 18 and main body member 16. That is, in the state where electrical device 10 is mounted on wall 1, second member 84 is positioned in front of attachment member 18 and behind actuator 12 and main body member 16, and overlaps attachment member 18, actuator 12, and main body member 16 when viewed from the Z-axis direction. In the state where electrical device 10 is mounted on wall 1, second member 84 is in the form of a plate whose thickness direction is the Z-axis direction, and is in an annular shape having through hole 88 in the center when viewed from the Z-axis direction. The main surface of second member 84 on the side of actuator 12 is in contact with first plate-shaped portion 66, and the main surface on the opposite side of second member 84 from actuator 12 is in contact with plate-shaped portion 76. Second member 84 is covered with attachment member 18 and main body member 16 and housed inside electrical device 10. Second member 84 has greater elasticity (flexibility) than attachment member 18 and second shell member 64 of main body member 16. For example, second member 84 is formed of soft urethane, urethane foam, rubber, or the like.

Support member 22 is provided on the opposite side of attachment member 18 from actuator 12. That is, in the state where electrical device 10 is mounted on wall 1, support member 22 is positioned behind attachment member 18 and actuator 12, and overlaps attachment member 18 and actuator 12 when viewed from the Z-axis direction. In the state where electrical device 10 is mounted on wall 1, support member 22 is in the form of a plate whose thickness direction is the Z-axis direction and is in an annular shape having through hole 90 in the center when viewed from the Z-axis direction.

Support member 22 is coupled to main body member 16. As described above, main body member 16 includes second shell member 64, and second shell member 64 includes a plurality of threaded portions 67. Specifically, support member 22 includes a plurality of through holes 92 through which the plurality of fastening members 24 are inserted, and by threadedly engaging each fastening member 24 inserted through respective through hole 92 of support member 22 and respective through hole 81 of attachment member 18 with respective threaded portion 67 of main body member 16, support member 22 is coupled to main body member 16 so as not to be separated from main body member 16. Support member 22 contacts first member 82 but does not contact attachment member 18. For example, support member 22 is formed of metal or the like.

Cover member 26 is provided on the opposite side of support member 22 from actuator 12 and covers support member 22.

Each of the plurality of terminals 28 is a terminal to which electric wire 5 that electrically connects the external power source and actuator 12 is connected. Electric wire 5 is not a part of electrical device 10 but is provided on the side of wall 1, and is an electric wire for supplying electric power to electrical device 10 from an external power source. The plurality of terminals 28 are electrically connected to coil 46 of actuator 12, whereby electric power from electric wire 5 is supplied to coil 46 of actuator 12. The plurality of terminals 28 protrude to the back from a plurality of through holes 74 and do not overlap actuator 12 when viewed from the Z-axis direction. It should be noted that each of the plurality of terminals 28 may overlap actuator 12 when viewed from the Z-axis direction in the state where electrical device 10 is mounted on wall 1. Each of the plurality of terminals 28 is connected to electric wire 5 from the direction orthogonal to the vibration direction of actuator 12. That is, in this embodiment, each of the plurality of terminals 28 is connected to electric wire 5 from the direction orthogonal to the Z-axis direction in the state where electrical device 10 is mounted on wall 1.

Figure 7:
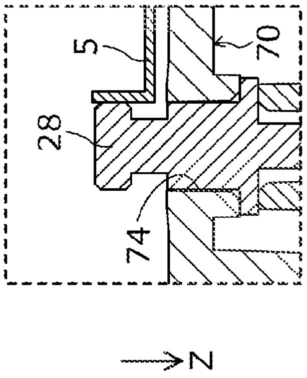
FIG. 7 is a diagram showing terminals and electrical wires of the electrical device in FIG. 1.

FIG. 7 is an end view showing terminal 28 and electric wire 5 of electrical device 10 of FIG. 1. As shown in FIG. 7, terminal 28 is connected to electric wire 5 from a direction orthogonal to the Z-axis direction in the state where electrical device 10 is mounted on wall 1. Therefore, when terminal 28 vibrates back and forth by actuator 12 vibrating, terminal 28 can be easily slid relative to electric wire 5. This makes it difficult for the vibration of terminal 28, that is, the vibration of actuator 12, to be transmitted to electric wire 5, thereby suppressing the vibration of actuator 12 from being transmitted to wall 1 via electric wire 5.

A plurality of absorbing members 29 are attached to second plate-shaped portion 70. The plurality of absorbing members 29 are not in contact with wall 1 in the state where electrical device 10 is mounted on wall 1. For example, the plurality of absorbing members 29 are members for suppressing electrical device 10 from tilting against wall 1 by contacting to wall 1 in such a case or the like that electrical device 10 is mounted on wall 1 included in a side wall instead of the ceiling of the room and tilted against wall 1. Contact of the plurality of absorbing members 29 with wall 1 can suppress second shell member 64 and the like of main body member 16 from contacting wall 1.

In electrical device 10 as described above, in the state where electrical device 10 is mounted on wall 1, when actuator 12 vibrates, main body member 16 to which actuator 12 is fixed may also vibrate back and forth. In addition, the vibration of main body member 16 may also cause support member 22 coupled to main body member 16 to vibrate back and forth.

Here, in electrical device 10, support member 22 coupled to main body member 16 is placed on attachment member 18 via first member 82, and actuator 12, main body member 16, and the like are supported by attachment member 18 in such a manner as to hang from attachment member 18. That is, the weight of actuator 12, main body member 16, and the like is added to attachment member 18. Therefore, without first member 82, support member 22 and attachment member 18 would come into direct contact with each other, and the vibration of actuator 12 would be easily transmitted to attachment member 18 via main body member 16, support member 22, and the like.

In electrical device 10, since first member 82 is provided between support member 22 and attachment member 18, the vibration of support member 22 is absorbed by first member 82, and the vibration of support member 22 can be suppressed from being transmitted to attachment member 18. In this way, first member 82 can suppress transmission of the vibration of actuator 12 to attachment member 18. That is, the vibration of actuator 12 can be suppressed from being transmitted to wall 1 via attachment member 18, and the vibration of wall 1 can be suppressed.

In addition, although main body member 16 and attachment member 18 do not come into direct contact with each other even without second member 84, electrical device 10 is provided with second member 84 between main body member 16 and attachment member 18 so that the vibration of main body member 16 is absorbed by second member 84, and the vibration of main body member 16 can be suppressed from being transmitted to attachment member 18. In this way, second member 84 can further suppress transmission of the vibration of actuator 12 to attachment member 18. That is, the vibration of actuator 12 can be suppressed from being transmitted to wall 1 via attachment member 18, and the vibration of wall 1 can be further suppressed.

It should be noted that attachment member 18 is not in direct contact with any portion of electrical device 10 other than first member 82 and second member 84. That is, since main body member 16, support member 22, and the like are supported by attachment member 18 only through absorbing member 20, these vibrations can be absorbed by absorbing member 20 before being transmitted to attachment member 18.

Figure 8:
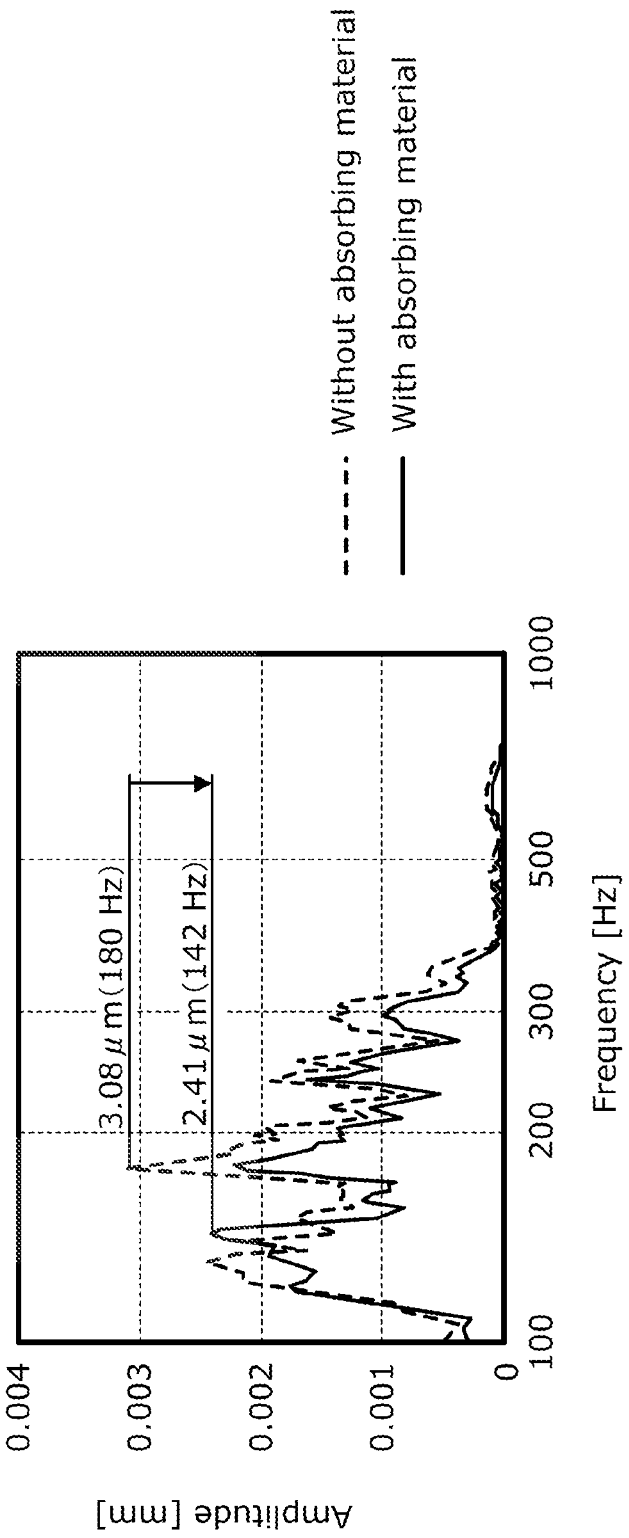
FIG. 8 is a graph showing a comparison result between the electrical device in FIG. 1 and an electrical device of a comparative example.

FIG. 8 is a graph showing a comparison result between electrical device 10 in FIG. 1 and the electrical device in the comparative example. The electrical device in the comparative example has the same configuration as electrical device 10 without absorbing member 20.

As shown in FIG. 8, the vibration of wall 1 of the building was measured using electrical device 10 with absorbing member 20 and the electrical device in the comparative example without absorbing member 20.

With regard to electrical device 10, in the state where electrical device 10 was mounted on wall 1, an audio signal was transmitted from the smartphone to electrical device 10 via wireless communication and the volume was maximized to vibrate actuator 12. That audio signal is a sweep signal whose frequency changes in the range of 20 Hz to 1500 Hz. Vibration of wall 1 at a position of 10 cm from the center of the electrical device was measured in the direction orthogonal to the Z-axis plus direction.

Similarly, for the electrical device in the comparative example, in the state where that electrical device was mounted on wall 1, an audio signal was transmitted from the smartphone to that electrical device by wireless communication, and the volume was maximized to vibrate actuator 12 of that electrical device. That audio signal is also a sweep signal whose frequency changes in the range of 20 Hz to 1500 Hz. Vibration of wall 1 at a position of 10 cm from the center of that electrical device was measured in the direction orthogonal to the Z-axis plus direction.

In the case of using electrical device 10, compared with the case of using the electrical device in the comparative example, the maximum value of the amplitude of the sound with frequencies between 100 Hz and 1000 Hz decreased from 3.08 μm (0.00308 mm) to 2.41 μm (0.00241 mm), which was a reduction of approximately 22%. In addition, in the case of using electrical device 10, compared with the case of using the electrical device in the comparative example, the average value of the amplitude of the sound with frequencies between 100 Hz and 1000 Hz decreased by about 29%. In this way, by providing absorbing member 20, the vibration of wall 1 was suppressed.

Electrical device 10 according to the embodiment has been described above.

Electrical device 10 according to the present embodiment is an electrical device that is mounted on wall 1 of a building, the electrical device including: actuator 12 that vibrates; and absorbing member 20 that absorbs vibration of actuator 12 and is positioned behind actuator 12 in a predetermined direction, where a direction from a back side to a front side of wall 1 is defined as a direction toward a front in the predetermined direction in a state where electrical device 10 is mounted on wall 1.

According to this, in the state where electrical device 10 is mounted on wall 1, when the Z-axis plus direction from the back side to the front side of wall 1 is defined as a direction toward a front in the Z-axis direction, absorbing member 20 is positioned behind actuator 12 in the Z-axis direction, so that it is possible to suppress the vibration of actuator 12 from being transmitted to wall 1 while suppressing electrical device 10 from becoming large in the direction orthogonal to the Z-axis direction. Accordingly, vibration of wall 1 can be easily suppressed without providing a sound absorbing material or the like on wall 1.

In addition, in the state where electrical device 10 is mounted on wall 1, electrical device 10 according to the present embodiment further includes attachment member 18 positioned behind actuator 12 in the Z-axis direction and attached to wall 1, and absorbing member 20 includes first member 82 provided on the opposite side of attachment member 18 from actuator 12.

According to this, the vibration of actuator 12 can be suppressed from being transmitted to attachment member 18 by first member 82. By suppressing the vibration of attachment member 18 attached to wall 1 of electrical device 10 in this manner, the vibration of wall 1 can be more easily suppressed.

In addition, electrical device 10 of the present embodiment further includes main body member 16 to which actuator 12 is fixed, and support member 22 provided on the opposite side of attachment member 18 from actuator 12 and coupled to main body member 16, and first member 82 is provided between attachment member 18 and support member 22.

According to this, when actuator 12 vibrates, the vibration of actuator 12 is transmitted to support member 22 via main body member 16, and support member 22 may vibrate, but the vibration of support member 22 can be suppressed from being transmitted to attachment member 18. This makes it possible to suppress vibration of wall 1 more easily.

In addition, in electrical device 10 of the present embodiment, main body member 16 is provided between actuator 12 and attachment member 18, and absorbing member 20 includes second member 84 provided between attachment member 18 and main body member 16.

According to this, when actuator 12 vibrates, the vibration of actuator 12 is transmitted to main body member 16, and main body member 16 may vibrate, but the vibration of main member 16 can be suppressed from being transmitted to attachment member 18. This makes it possible to suppress vibration of wall 1 more easily.

In addition, in electrical device 10 of the present embodiment, first member 82 contacts attachment member 18 and support member 22, and second member 84 contacts attachment member 18 and main body member 16.

According to this, it is possible to suppress the vibration of attachment member 18, support member 22, and main body member 16, so that the vibration of wall 1 can be suppressed more easily.

In addition, in electrical device 10 of the present embodiment, wall 1 includes socket component 3 that is engageable with attachment member 18, and attachment member 18 is engaged with socket component 3 to be mounted on wall 1.

According to this, electrical device 10 can be easily mounted on wall 1.

In addition, in electrical device 10 according to the present embodiment, actuator 12 vibrates back and forth in the Z-axis direction in the state where electrical device 10 is mounted on wall 1.

According to this, since absorbing member 20 is provided in the vibration direction of actuator 12, the vibration of actuator 12 can be easily absorbed, and the vibration of wall 1 can be suppressed more easily.

In addition, electrical device 10 of the present embodiment further includes terminal 28 to which electric wire 5 for electrically connecting the external power source and actuator 12 is connected, and terminal 28 is connected to electric wire 5 from the direction orthogonal to the vibration direction of actuator 12.

According to this, the vibration of actuator 12 can be suppressed from being transmitted to electric wire 5 via terminal 28, and the vibration of wall 1 due to the vibration of electric wire 5 can be suppressed, so that the vibration of wall 1 can be more easily suppressed.

In addition, in electrical device 10 according to the present embodiment, electrical device 10 is a speaker.

According to this, it is possible to suppress the vibration of wall 1 due to the vibration of the speaker being transmitted to wall 1.

Other Embodiments, Etc.

Although the electrical device according to one or more aspects has been described above based on the embodiment, the present disclosure is not limited to this embodiment. Forms obtained by applying various modifications to the present embodiment conceived by a person skilled in the art without departing from the spirit of the present disclosure may also be included in the present disclosure.

In the embodiment described above, the case where electrical device 10 is an embedded speaker has been described, but the present disclosure is not limited thereto. For example, the electrical device may be a hanging speaker that is not embedded in a wall, or a lighting device that includes a speaker. In addition, the electrical device may be an electrical device such as a blower having a fan, and in this case, the actuator may be a motor that rotates the fan. In addition, the electrical device may be a camera or the like, and in this case, the actuator may be an actuator that drives a camera lens or the like.

In the embodiment described above, the case where wall 1 of the building is included in the ceiling of room 2 inside the building has been described, but the present disclosure is not limited thereto. For example, the wall of the building may be a wall included in the floor of a room inside the building, a wall included in a side wall of a room inside the building, a wall included in an outer wall of the building, or the like.

In the embodiment described above, the case where actuator 12 vibrates back and forth in the Z-axis direction in a state where electrical device 10 is mounted on wall 1 has been described, but the present disclosure is not limited thereto. For example, the actuator may vibrate in a direction intersecting the Z-axis direction in a state where the electrical device is mounted on the wall.

In the embodiment described above, the case where absorbing member 20 has first member 82 and second member 84 has been described, but the present disclosure is not limited thereto. For example, absorbing member 20 may have only first member 82 or only second member 84 out of first member 82 and second member 84. Specifically, for example, in the state where electrical device 10 is mounted on wall 1 included in the floor, that is, when electrical device 10 is mounted in the opposite direction to the embodiment described above, absorbing member 20 may have only second member 84 out of first member 82 and second member 84. In addition, for example, even in the state where electrical device 10 is mounted on wall 1 included in the ceiling, the vibration absorption effect of actuator 12 can be obtained even if absorbing member 20 has only second member 84 out of first member 82 and second member 84 by attaching second member 84 to attachment member 18 and second shell member 64 of main body member 16 with double-sided tape or the like.

In the embodiment described above, the case where attachment member 18 is attached to wall 1 by being engaged with socket component 3 of wall 1 has been described, but the present disclosure is not limited thereto. For example, the attachment member may be attached to the wall by being screwed to the wall.

In addition, forms obtained by applying various modifications to above each embodiment conceived by a person skilled in the art or forms realized by arbitrarily combining the components and functions in each embodiment without departing from the spirit of the present disclosure are also included in this disclosure.

INDUSTRIAL APPLICABILITY

The present disclosure can be used for an electrical device mounted on a wall of a building.

The invention claimed is:

1. An electrical device that is mounted on a wall of a building, the electrical device comprising:

an actuator that vibrates;

an absorbing member that is made of an elastic material, absorbs vibration of the actuator and is positioned behind the actuator in a predetermined direction, where a direction from a back side to a front side of the wall is defined as a direction toward a front in the predetermined direction in a state where the electrical device is mounted on the wall;

an attachment that is positioned behind the actuator in the predetermined direction and attached to the wall by being connected to the wall in the state where the electrical device is mounted on the wall;

a main body member to which the actuator is fixed; and a support member that is provided on an opposite side of the attachment from the actuator and coupled to the main body member, wherein:

the absorbing member includes a first member made of the elastic material and provided on the opposite side of the attachment from the actuator, at least a portion of the attachment is positioned between the actuator and the first member in the predetermined direction, and the first member is provided between the attachment and the support member in the predetermined direction.

2. The electrical device according to claim 1, wherein:

the main body member is provided between the actuator and the attachment, and the absorbing member includes a second member made of the elastic material and provided between the attachment and the main body member in the predetermined direction.

3. The electrical device according to claim 2, wherein the first member is in contact with the attachment and the support member, and the second member contacts the attachment and the main body member.

4. The electrical device according to claim 1, wherein the wall includes a socket component that is engageable with the attachment, and the attachment is attached to the wall by being engaged with the socket component.

5. The electrical device according to claim 1, wherein the actuator vibrates back and forth in the predetermined direction in the state where the electrical device is mounted on the wall.

6. The electrical device according to claim 1, further comprising:

a terminal to which an electric wire for electrically connecting an external power supply and the actuator is connected, wherein the terminal is connected to the electric wire from a direction orthogonal to a vibration direction of the actuator.

7. The electrical device according to claim 1, wherein the electrical device is a speaker.

8. The electrical device according to claim 1, wherein, when viewed along the predetermined direction, the actuator, the first member and the attachment overlap with each other.

* * * * *